May 23, 1944.　　G. LOWKRANTZ ET AL　　2,349,506
RECORDING NAVIGATION INSTRUMENT
Filed April 7, 1941　　3 Sheets-Sheet 1

EDWIN A. LINK, JR.
GUNNE LOWKRANTZ
INVENTORS

BY Charles G. Randall
ATTORNEY.

EDWIN A. LINK, JR.
GUNNE LOWKRANTZ
INVENTORS

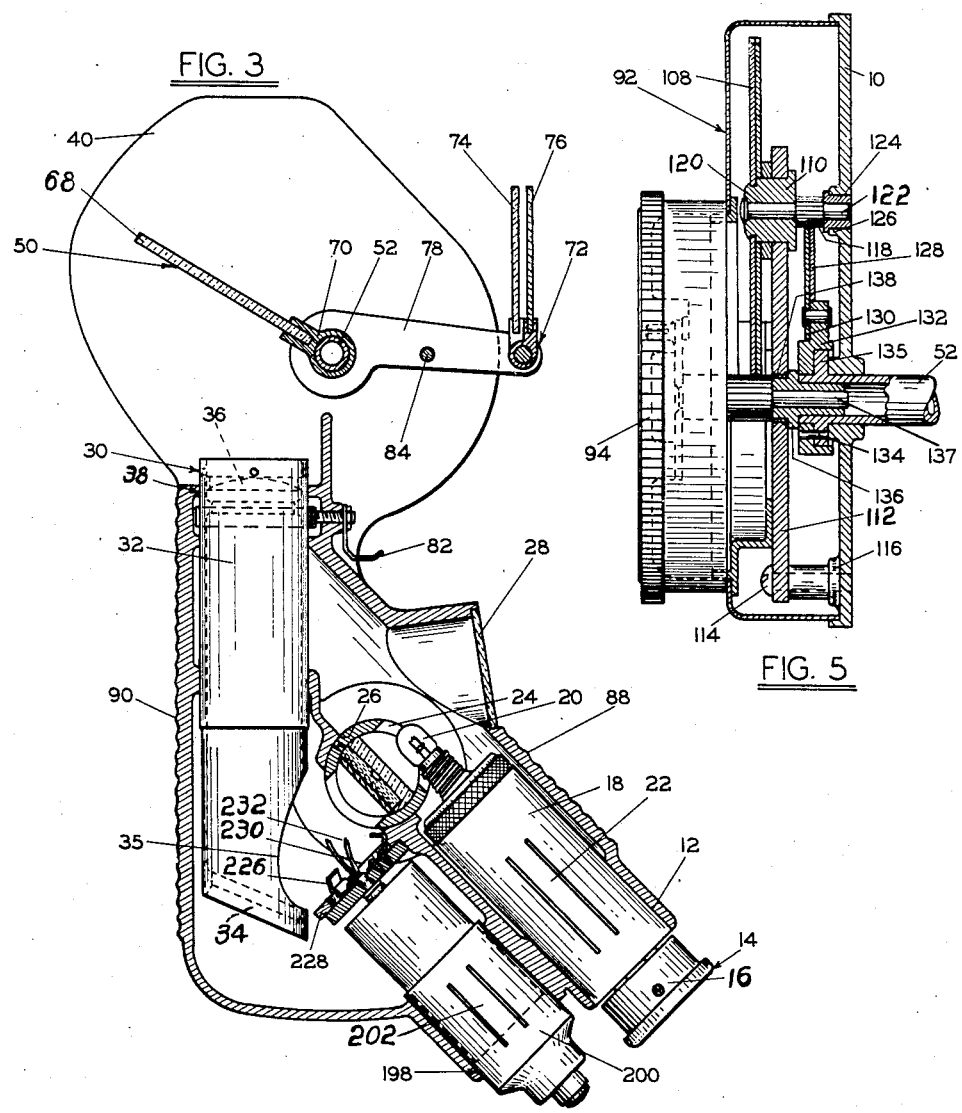

Patented May 23, 1944

2,349,506

UNITED STATES PATENT OFFICE 2,349,506

RECORDING NAVIGATION INSTRUMENT

Gunne Lowkrantz and Edwin A. Link, Jr., Binghamton, N. Y., assignors to Link Aviation Devices, Inc., Binghamton, N. Y., a corporation of New York Application April 7, 1941, Serial No. 387,340

8 Claims. (Cl. 234—1)

The present invention pertains to recording navigation instruments and particularly, to sextants which are used for measuring angular distances between objects for the purpose of determining altitudes so as to ascertain latitude and longitude.

In some aspects, this invention represents an improvement over the sextant disclosed in a copending application Serial No. 387,074, filed April 5, 1941, by Edwin A. Link, Jr., and Harold A. Marsh, which comprises an instrument having a one-piece casing of cellular construction with certain essential units removably mounted therein and arranged to produce a balanced design. In addition to the advantages of the novel construction set forth in the prior application, the invention to be described herein presents others which will now be described.

As a preliminary, it is noted that the instrument of this invention is intended primarily for aerial navigation and is adapted to the peculiar problems there encountered.

The principal purpose of this invention is to provide a sextant or similar instrument having means for recording a series of observations to the end that a number of shots or sights can be taken in rapid succession on a selected celestial object or, alternately, on a number of such objects. If the first of these procedures is followed, as in obtaining a line of position, the recordings are arranged so that a visual averaging or median selection of the different angular observations can be made and the corresponding arc reading employed in conjunction with a mean time determined from the beginning and end of the observations. When a fix is being obtained with the second procedure, the angular positions or altitudes for the respective objects can be accurately reproduced and read at relative leisure, it being necessary to note only the mean time determined from the beginning and end of each series of observations. Obviously, the precision and convenience of aerial navigation are greatly enhanced by the novel means making possible the outlined procedure. The unique procedure which has been stated minimizes error due to inaccuracy as to course and distance run between observations.

More specifically, one of the novel features of this invention is the setting mechanism for the index arm which comprises a hand wheel integrally connected to a recording cylinder or other circular record receiving member, and arranged to rotate the shaft upon which are mounted the index arm and the index mirror by means of a reduction gear train.

A further important feature of novelty resides in the provision of marking or scribing means disposed for cooperation with the record receiving cylinder of the setting mechanism and having a manually operable member arranged for convenient operation while an observation is being made.

The invention also comprehends a novel instrument illumination system for night use which includes protected means for illuminating the record receiving cylinder of the setting mechanism and a lamp connected to the index arm near its vernier end for movement therewith and illumination of the vernier and graduated arc of the instrument.

These and other features of the invention comprising certain details of construction and arrangement of parts will now be described as embodied in an illustrative instrument and pointed out in the appended claims.

Referring to the accompanying drawings,

Fig. 3 represents a vertical longitudinal section on line III—III of Fig. 2;

Fig. 5 represents a further transverse section along line V—V of Fig. 1; and

Figure 1:
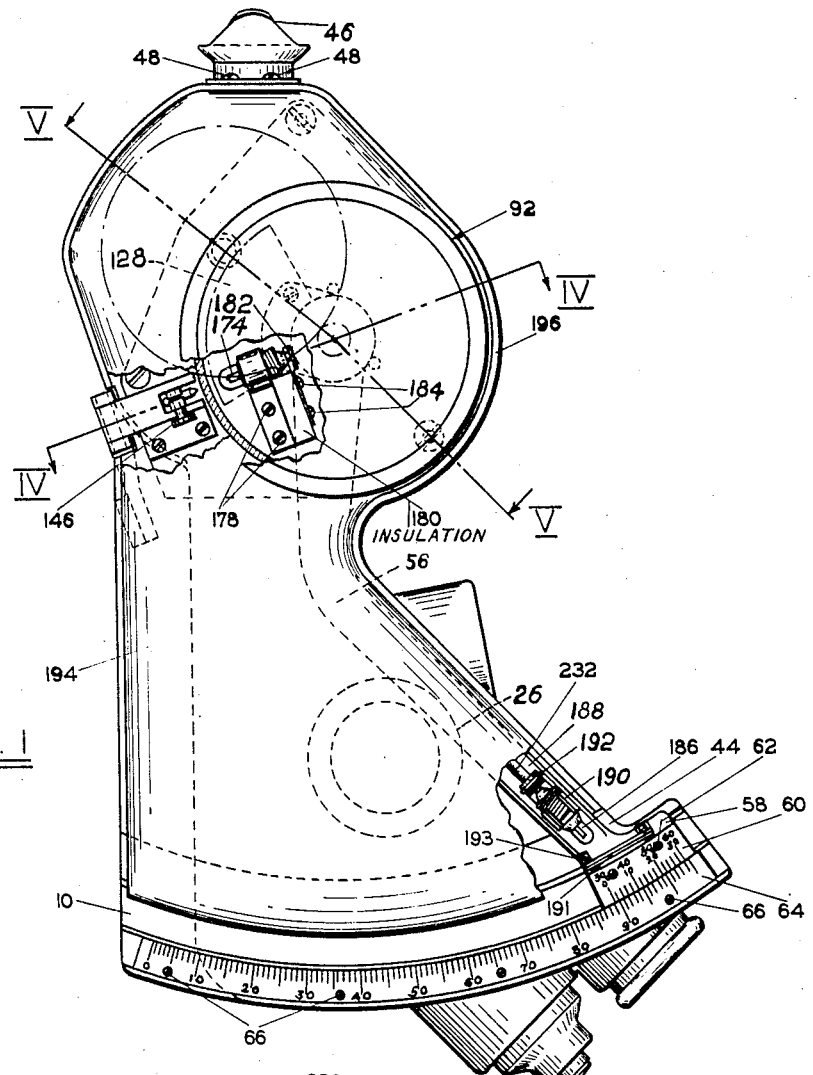
Fig. 1 shows a side elevation of the complete instrument with certain parts broken away.

The embodiment of the invention illustrated in the drawings is of an octant having a one-piece metallic casing 10. As seen best in Fig. 3, the casing 10 is provided at its lower end with a cylindrical chamber 12 for receiving an electric lamp unit 14 including a dry cell battery (not shown), a combined rheostat and switch control 16 in the form of a headed knob which projects from the casing, a casing and socket assembly 18, and a small electric lamp 20. The electric lamp unit 14 may be frictionally held within the complemental chamber 12 by means of light leaf springs 22, 22 secured to the exterior of the casing and socket assembly 18.

Since the present instrument is intended for aerial navigation, it will be appreciated that an artificial horizon must be provided. For this purpose, an encased bubble chamber unit 24 is fitted snugly into a corresponding circular chamber 26 in the side of casing 10. Leaf springs may also be used for retaining the removable bubble unit. A peep glass 28 is suitably mounted on the upper front side of casing 10 for observation of the lamp 20 and natural illumination of bubble unit 24. Any selected type of bubble may be used as desired or required, and the chamber construction indicated permits ready interchangeability.

There is a further removable component in the form of an image reflecting unit 30 which comprises a tubular casing 32 having at its lower end as seen in Fig. 3 an angularly disposed mirror 34 exposed through a side opening 35 to pick up the bubble image illuminated through peep glass 28 or by electric lamp 20. At its upper end, the tubular casing 32 carries a collimating lens 36. The casing 10 is provided with a downwardly extending chamber or opening 38 for receiving and frictionally supporting the image reflecting unit 30. The mirror 34 is so arranged as to direct the bubble image through collimating lens 36 and between a pair of spaced sides or parallel furcations 40 and 42 (the latter of which has a downward extension 44 for purposes to be described) of the casing 10 to an apertured eyepiece 46. Eyepiece 46 is mounted on the upper end of casing furcation 42 by means such as screws 48.

Figure 2:
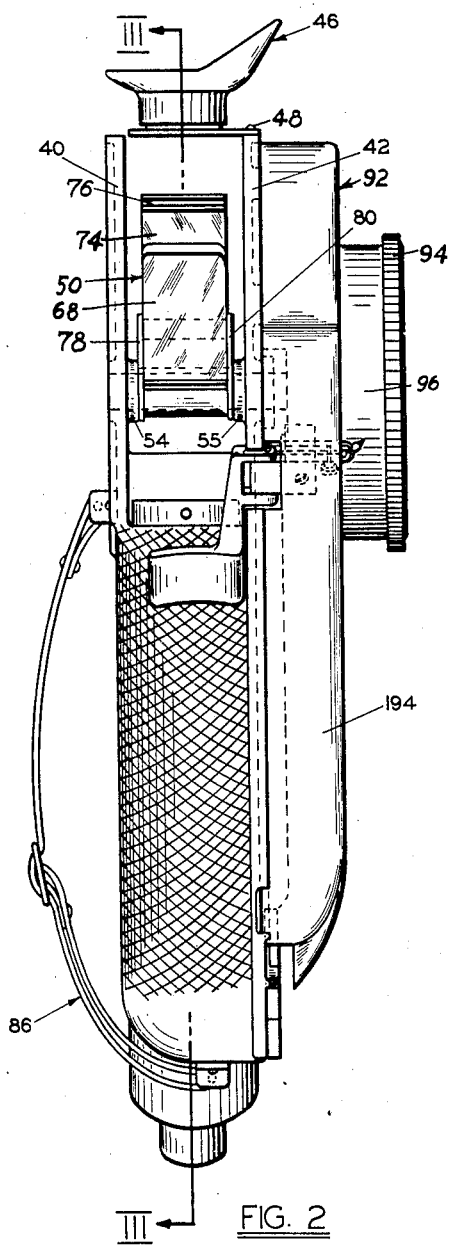
Fig. 2 is a left end elevation of the instrument as seen in Fig. 1.

Next in order of consideration is mirror indexing unit assembly 50 (Figs. 2 and 3). Tubular shaft 52 is rotatably supported in an opposed pair of casing bosses 54 and 55 and has fixed to its end which extends outside of the casing 10 an index arm or alidade 56 that hangs downwardly and has the angular shape shown in dotted lines in Fig. 1. At its lower end, the index arm 56 is provided with an enlarged arcuate portion 58 recessed to accommodate a vernier scale 60 mounted adjustably thereon by means of attaching screws 62, 62. On the same side of the lower and arcuate end of the casing 10, there is mounted a graduated arc or limb 64, as by attaching screws 66, 66. The engaging surface of the vernier scale 60 and graduated arc 64 are complementarily shaped and closely fitted for accurate relative movement. An optical mirror 68 is mounted between the upstanding arms or sides 40 and 42 of the casing 10 through the medium of an open sleeve 70 which is clamped to the lower mirror edge and fixedly secured to the shaft 52 for angular movement therewith. The sweeping motion of the index mirror 68 about an axis coincident with that of the pivoted end of the index arm 56 defines the sighting plane of this instrument.

It is to be particularly noted that index mirror 68 and index arm 56 are both fixed to shaft 52 and, therefore, always move simultaneously through the same angle.

A sunshade unit 72 comprising selectively usable filter glasses 74 and 76 is independently pivoted on shaft 52 by means of a pair of arms 78 and 80. Fig. 3 shows a spring clip 82 which is arranged on the outside of the casing 10 in a position to receive the pivoted ends of filter glasses 74 and 76 to retain the sunshade unit 72 in its inoperative position. A rod 84 which extends between the pivoted arms 78 and 80 provides a stop for the filter glasses 74 and 76 and prevents undesirable inward movement through said arms.

Those familiar with the use of such instruments will understand that the function of the optical indexing mirror 68 is to bring into coincidence the image of the bubble of the bubble unit 24, as reflected by the mirror 34, and the image of the celestial body being observed. For observations on the moon and sun the observer looks through positioning piece 46 and, therefore, he brings into coincidence the image of the bubble as reflected by the mirror 34 and the image of the moon or sun as reflected by the index mirror 68, but for observations on the stars the observer places his eye to the left of the furcation 40 as seen in Fig. 1 and brings into coincidence the image of the star as seen directly through the index mirror 68 and the image of the bubble as reflected by the mirror 34 and index mirror 68.

Fig. 2 illustrates an adjustable handle strap 86 which extends along the opposite side of the casing 10 from the index arm 56 to receive the hand and permit the fingers thereof to extend over a roughened grasping surface 88 adjacent the peep glass 28 of Fig. 3. The opposite vertical portion of the casing is likewise roughened at 90 for accommodation of a palm portion of the hand.

Figure 4:
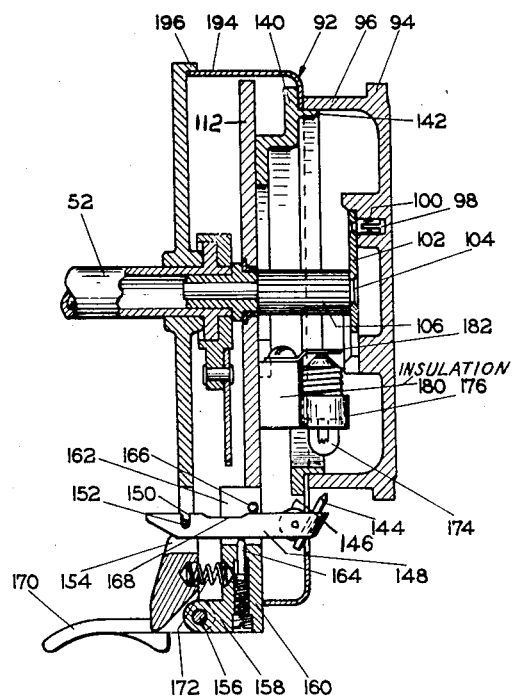
Fig. 4 shows a transverse section taken on line IV—IV of Fig. 1.

The setting and recording means indicated generally by reference numeral 92 comprises a member in the form of a knurled hand wheel 94 integrally connected with a record receiving cylinder 96 which extends inwardly of the instrument. Preferably, the wheel 94 and cylinder 96 are formed in one piece of a light-transmitting or transparent material such as Celluloid, "Lucite," or an acrylic resin. As shown in Fig. 4, the inside of the hand wheel 94 is provided with an eccentric socket 98 for receiving a snap-fastening element 100 extending from one face and near the periphery of a plate 102 which is secured by a central rivet 104 to a pinion gear 106. Because hand wheel 94 and record receiving cylinder 96 are held by snap-fastening element 100 it is possible to easily detach these integral parts and replace with a substitute member. A split gear disc 108 (Fig. 5) is centrally attached, as by riveting to a hub bushing 110 rotatably mounted in an end of a relatively rigid plate 112. Plate 112 is secured by means such as screw 114 to a boss 116 extending outwardly of main casing 10.

Coaxially and inwardly of gear disc 108 is another small pinion gear 118 having an integral shaft 120 which extends outwardly and is riveted through the center of the hub bushing 110. At the opposite end of pinion gear 118 is a stub shaft 122 rotatably supported by a bushing 124 fitted within a boss 126 of the casing 10.

Referring to Figs. 1 and 5, note is now taken of a split gear segment 128 riveted at its inner end to an extension 130 of a collar 132 secured by a pin 134 to a flange 135 which is integral with the outer end of the shaft 52 for the index mirror 68. The collar 132 is formed on the upper end of index arm 56. It will therefore be realized that a movement of split gear segment 128 will cause a movement of collar 132, shaft 52, index mirror 68 and index arm 56. Gear segment 128 meshes with pinion gear 118 and completes the two-stage reduction gearing train between the hand wheel 94 and the shaft 52 of the index arm 56. To avoid confusion, the gearing train or mechanism is arranged to rotate the index arm 56 in the same direction as the hand wheel 94.

A collared sleeve 136 fitting within the outer end of shaft 52 serves as a bearing for the inwardly extending shaft 137 of the first pinion gear 106, the sleeve 136 at its outer end passing through plate 112 and being brazed thereto at 138. Shaft 137 is suitably held within collared sleeve 136 to prevent relative axial movement between these two parts.

The outer side of supporting plate 112 is secured to a cylindrical casing member 140 which includes a horizontally extending cylindrical band 142 serving as a bearing for the inner end of recording cylinder 96.

In Fig. 4, there is shown the marking or scribing means comprising a scriber 144 which may be merely a sharpened length of pencil lead, arranged in radial alignment with the axis (52) of the index arm 56. An ordinary clamping and adjusting means 146 holds the scriber 144 in a supporting arm 148 pivoted by means of a transverse notch 150 on a pin 152 carried by a clevis lug 154. The lug 154 forms an arm of a bell crank which has a pivot pin connection 156 with an ear 158 of a bracket 160 which, in turn, is suitably attached to the main casing 10. As seen in Fig. 4, there is a slot 162 at the upper end of bracket 160 for reciprocably receiving the scriber arm 148. An adjustable, spring-pressed plunger 164 is arranged in the bracket 160 so as to urge the scriber arm 148 against a detent pin 166, also rigid with the bracket, and capable of engaging an extended cam notch 168 when the arm 148 is reciprocated outwardly of the position shown. A thumbpiece 170 at the observation end of the instrument forms the other arm of the bell crank of which arm or lug 154 has been described.

As the manually operable means in the form of thumbpiece 170 is turned clockwise against the force of a compression spring 172 mounted between pivoted lug 154 and fixed bracket 160, the scriber arm 148 will be moved to the right and depressed toward the record receiving cylinder 96 as the detent pin 166 enters cam notch 168. The scriber 144 will then mark the record receiving cylinder 96 with a vertical line the length of which is determined by the extent of notch 168. Release of the thumbpiece 170 reverses this motion and eventually raises the scriber 144 to the position of Fig. 4.

Consideration will next be given to the novel illuminating system which has been incorporated in the illustrative instrument for facilitating reading of the scriber marks on the record receiving cylinder 96 and the position of the alidade vernier 60 with respect to the graduated arc 64.

A relatively small electric lamp 174 is mounted within the record receiving cylinder 96 opposite the scriber 144 and fixedly with respect to the main casing 10. The lamp 174 is supported by a metal socket loop 176 grounded to the metallic casing 10 through plate 112 and attaching screws 178 which pass through an insulating block 180. Figs. 1 and 4 show best a spring contact strip 182 engaging the base contact of lamp 174 and retained on the insulating block 180 by screws 184 which are free of contact with the grounded casing 10.

The vernier 60 and graduated arc 64 are illuminated by an outwardly pointing electric lamp 186 within a depressed portion 188 of the index arm 56, as shown in Fig. 1; and the lamp 186 has its threaded portion engaged and retained by an open spring clip socket 190 secured in contact with the index arm 56, and its base contact in engagement with a plate contact 192 secured by insulation in spaced relation to the arm 56. The lamp 186 moves with the index arm 56 so as to illuminate at all times the portion of arc 64 adjacent the vernier 60.

A lightweight housing member 194, which is appropriately notched and apertured to receive the various moving parts which have been described in detail, is detachably secured to the front or arc side of casing 10 and extends between the cylindrical casing member 140 and the record receiving cylinder 96 as illustrated in Figs. 2 and 4. The housing member 194 is further retained and sealed by a small peripheral flange 196 extending around all but the arc side of furcation 42 and its plate extension 44 on the front face of the casing 10. In this way, practically all of the moving parts of the instrument except vernier scale 60, the indexing mirror 68 and the pivot pin 156 of thumbpiece 170 are covered by the housing member 194; suitable clearance for the arm 56 is of course provided at the lower edge of the housing member 194 as viewed in Fig. 1.

Figure 6:
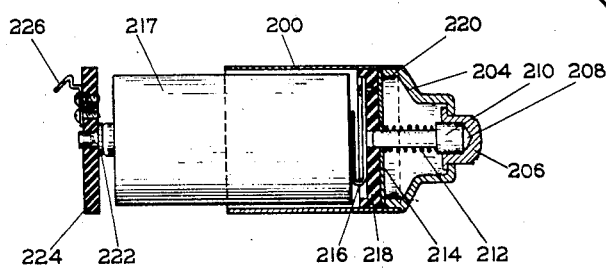
Fig. 6 is a side elevation partly in section of the battery and switch unit for illumination of the recording device and graduated arc.

Fig. 3 best illustrates a bore or chamber 198 in the casing 10 and parallel to the electric lamp unit 14 for the bubble snugly receiving a metal case 200 having longitudinally extending leaf springs 202 to aid in frictionally retaining the same. Fig. 6 shows the attachment to the outer end of casing 200 of an outwardly extending cap 204 centrally apertured to retain a flanged button 206 of insulating material. There is also a socket 208 on the inner side of button 204 for receiving head of a reciprocal metal contact pin 210 encircled by a compression spring 212 which abuts the head of pin 210 and bears at its other end on a thin metal washer 214. The metal washer 214 is in circuit with the metal casing 10 through contact with the metal battery case 200. A spring clip 216 of U-shape engages one end contact of a dry cell 217 secured to a cupped washer 218 of insulating material by a drive screw 220.

When the button 206 is pressed, pin 210 engages spring clip 216, which engages one end contact of dry cell 217. The opposite end contact of dry cell 217 is in constant engagement with a flat button contact 222 (Fig. 6) extending through an insulating disc 224 provided with peripherally spaced spring clips 226 detachably securing said disc within an internal ring 228 of casing 10. With pin 210 engaging spring clip 216, the circuit is completed through the simultaneous contact of compression spring 212 with pin 210 and metal washer 214, which in turn is in contact with case 200.

An insulating conducting lead 230 extends from button contact 222 to the end contact of lamp 174 within the record receiving cylinder 96; and a second conducting lead 232 is likewise connected to the base contact 192 of the lamp 186 of the index arm 56.

If the instrument casing 10 is formed from an insulating material such as a molded plastic, provision must be made for a pair of electrical conductors to the lamps 174 and 186.

It is believed that the operation of the various parts of the instrument of the invention will be clear from the detailed descriptions which have been given. However, a summary will be made of the functioning of the instrument as a whole.

When the sextant is being used at night, observations will be made in the ordinary manner and the hand wheel 94 which controls operation of the reduction gear train will be used to move the index mirror 68, index arm 56 and its vernier to the required position. Instead of immediately reading the observation thus made, the thumbpiece 170 may be operated to make with the scriber 144 an effaceable mark on the record receiving cylinder 96. Then after a series of similar or different observations has been completed, the button 206 can be depressed to illuminate simultaneously the transparent record receiving cylinder 96 and the vernier scale 60 as well as the corresponding segment of arc 64. The median mark upon the record receiving cylinder 96 is then selected and the cylinder is then returned so that the median mark is directly opposite the scriber 144. The record receiving cylinder 96, index mirror 68 and index arm 56 will then be returned to the same positions that they occupied when this median observation, assumed to be the correct observation, was taken, and its value may be determined by a reference to vernier 60 and graduated arc 64.

The combination which this invention embodies of a record receiving drum connected to a shaft upon which are mounted an index mirror and an index arm through the medium of a reduction gear train affords definite advantages not possessed by comparable instruments of the prior art. In instruments of the median type hitherto known, expensive precision gears have been used in combination with a graduated alidade drum from which drum the most accurate reading possible with the instrument was to be taken. But with the instrument of this invention, the much less expensive and relatively less precise laminated gears 108, 128, which are turned by means of the record receiving cylinder 96 to rotate the index arm 56 and index mirror 68, do not in any wise impair the accuracy of the instrument, for the reason that the final reading is a vernier one made on the graduated arc 64 and the index mirror 68 and index arm 56 are always synchronized.

Having thus described the invention, what is claimed as new and desired to be secured by Letters Patent of the United States is:

1. In a sextant of the character described having a side, the combination comprising a rotatable index arm, a graduated scale cooperating with said index arm, a mechanism constructed and arranged to rotate said index arm, a hand operable member connected to said mechanism and extending externally of the instrument, a movable record receiving member associated with said first member for movement in a plane parallel to the plane of said first member, said index arm, said hand operable member and said record receiving member being arranged for movement in parallel planes on the same side of the sextant, marking means mounted adjacent the said record receiving member, and means for changing the relative positions of the record receiving member and marking means in addition to said movement of the record receiving member to make a record of the position of the said record receiving member corresponding to that of the said index arm.

2. In a sextant of the character described having a side, the combination comprising a rotatable index arm, a graduated scale cooperating with said index arm, a mechanism constructed and arranged to rotate said index arm, a hand operable member connected to said mechanism and extending externally of the instrument, a record receiving member associated with said first member for movement in a plane parallel to the plane of said first member, said index arm, said hand operable member and said record receiving member being arranged for movement in parallel planes on the same side of the sextant, marking means movably mounted adjacent the said record receiving member and normally spaced therefrom, and means for moving the marking means into engagement with the said record receiving member to make a record of the position of the said record receiving member corresponding to that of the said index arm.

3. In a sextant of the character described having a side, the combination comprising a rotatable index arm, a graduated scale cooperating with said index arm, a mechanism including reduction gearing constructed and arranged to rotate said index arm, a hand operable member connected to said mechanism and extending externally of the instrument, a record receiving member affixed to said hand operable member for movement therewith, said index arm, said hand operable member and said record receiving member all being arranged for parallel movement on the same side of the sextant and said hand operable member and said record receiving member being readily detachable from the other parts of said sextant, marking means movably mounted adjacent the said record receiving member and normally spaced therefrom, and means for moving the marking means into engagement with the said record receiving member to make a record of the position of the said record receiving member corresponding to that of the said index arm.

4. In a sextant of the character described having a side, the combination comprising a rotatable index arm pivoted at one end, means on said casing with which said index arm cooperates to give readings in degrees and minutes of the altitude of the body being observed, an index mirror fixedly connected to the pivoted end of the index arm for angular movement therewith, a gear train mechanism constucted and arranged to rotate said index arm and index mirror, a hand operable member connected to said mechanism and extending externally of the instrument, a record receiving member associated with said hand operable member and responsive to the movements thereof, said index arm, said hand operable member, and said record receiving member all being arranged for parallel movement on the same side of the sextant and parallel to the sighting plane of the sextant as defined by the motion of the index mirror, marking means mounted adjacent the said record receiving member, and means for moving the marking means into engagement with the said record receiving member to make a record of the angular position of the said record receiving member corresponding to that of the said index arm.

5. A sextant comprising a casing; a shaft rotatably mounted in said casing; an index mirror fixed to said shaft for rotation therewith; an index arm fixed to said shaft for rotation therewith; means on said casing with which said index arm cooperates to give readings in degrees and minutes of the altitude of the body being observed; a manually rotatable second shaft mounted in said casing; a movable record receiving member associated with said second shaft so as to be concordantly responsive to the movements thereof; marking means mounted adjacent the said record receiving member; means for changing the relative positions of the record receiving member and marking means in addition to said movement of the record receiving member to make a record of the position of the said record receiving member corresponding to that of the said index mirror; and means connecting said shafts whereby said first-mentioned shaft is rotated by the rotation of said second shaft.

6. In an instrument of the character described, the combination comprising a graduated arc, a rotatable index arm disposed for cooperation with said graduated arc, a reduction gear train constructed and arranged to rotate said index arm, a hand wheel connected to said gear train for moving the same, a rigid record receiving cylinder affixed to said wheel for rotation therewith, said record receiving cylinder and said hand wheel being readily detachable from the other parts of said sextant, marking means movably mounted adjacent the said record receiving cylinder and normally spaced therefrom, and means for moving the marking means into engagement with the said record receiving cylinder to produce a record of the angular position of the said record receiving cylinder corresponding to that of the said index arm.

7. An instrument of the character described comprising, in combination, a one-piece casing; a graduated arc mounted on said casing, a rotatable index arm having its pivot extending within said casing and disposed on the outside thereof for cooperation with said graduated arc; a gear train constructed and arranged to rotate said index arm, a hand wheel connected to said gear train and extending externally of said casing; a record receiving cylinder associated with said wheel for rotation therewith; marking means movably mounted on said casing adjacent the said record receiving cylinder and normally spaced therefrom, means for operating the marking means to bring a portion thereof into engagement with the said record receiving cylinder to make a record of the angular position of the said record receiving cylinder having a functional relation to that of the said index arm; and a detachable housing member cooperating with the said casing and said record receiving cylinder to enclose all except the vernier end of the index arm, the gear train, and a major portion of the marking means.

8. In combination with a sextant or the like including a casing and alidade means pivoted therein, a light-transmitting record receiving cylinder connected with the alidade means for concordant rotation, record marking means mounted on said casing for relative movement with respect thereto and operatively disposed with respect to said record receiving cylinder, an electric lamp between the outer end of said light-transmitting cylinder and the casing and arranged to illuminate the record making surface of the said record receiving cylinder, and means for energizing said electric lamp.

GUNNE LOWKRANTZ.
EDWIN A. LINK, Jr.